Aug. 15, 1950 H. W. SCHAEFER 2,519,292

COMBINATION RECORD PLAYER AND RADIO

Filed Aug. 22, 1946 2 Sheets-Sheet 1

WITNESSES:

F. E. Browder

INVENTOR

Harold W. Schaefer.

BY

ATTORNEY

Aug. 15, 1950 H. W. SCHAEFER 2,519,292

COMBINATION RECORD PLAYER AND RADIO

Filed Aug. 22, 1946 2 Sheets-Sheet 2

WITNESSES:
F. E. Browder

INVENTOR
Harold W. Schaefer.
BY
F. W. Lyle.
ATTORNEY

UNITED STATES PATENT OFFICE 2,519,292

COMBINATION RECORD PLAYER AND RADIO

Harold W. Schaefer, Eagles Mere, Pa., assignor to Westinghouse Electric Corporation, East Pittsburgh, Pa., a corporation of Pennsylvania Application August 22, 1946, Serial No. 692,293

8 Claims. (Cl. 179—100.12)

My invention relates to an arrangement for combining a record player and a radio, and has for an object to provide an improved combination of the character set forth.

A further object is to povide a simple arrangement for combining a record player with a radio for playing records so that intelligence from a record is audibly reproduced by the loudspeaker in the radio.

A still further object is to provide a record player and a radio so constructed that the radio may be easily combined with the record player for playing records so that the intelligence from the record is audibly reproduced by the loudspeaker in the radio, or the radio may be used separately for receiving radio broadcast programs.

A still further object is to provide a simple arrangement for combining a record player with a radio for playing records wherein by placing the radio in its operative position relative to the record player all necessary electrical connections between the record player and the radio, and between the radio and a proper source of power are automatically made.

A still further object is to provide a simple arrangement for combining a record player, including a cabinet for the same, with a radio for playing records, wherein the radio is combined with the record player by lowering the radio into the record player cabinet from a position above the record player cabinet.

These and other objects are effected by my invention as will be apparent from the following description and claims taken in connection with the accompanying drawings, forming a part of this application, in which:

Figure 1:
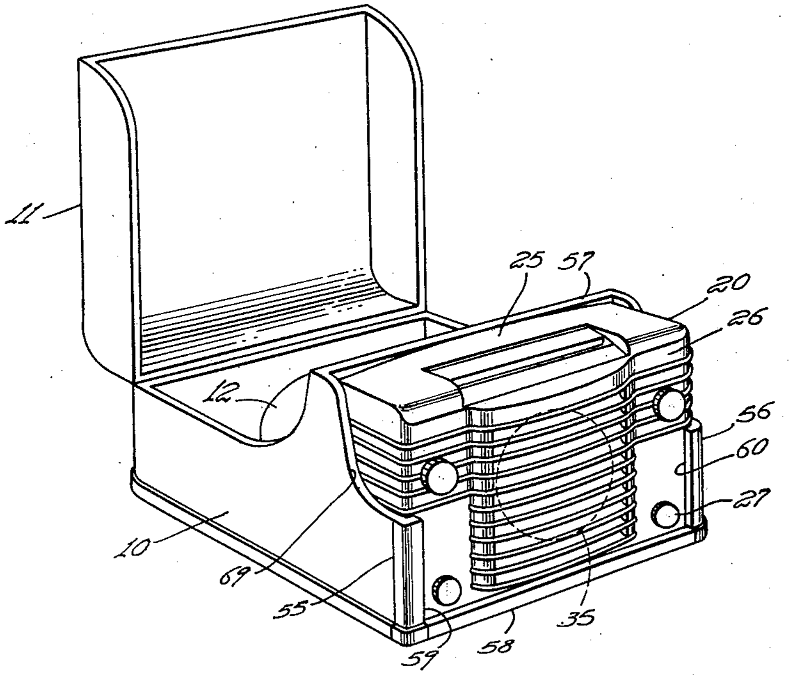
Figure 1 is a front perspective view of a combination of a record player and a radio receiving set embodying my invention, with the top of the record player cabinet open.

Referring to the drawing in detail, I show, in Figure 1, a record player and a radio receiving set combined for playing records as contemplated by my invention.

Figure 2:
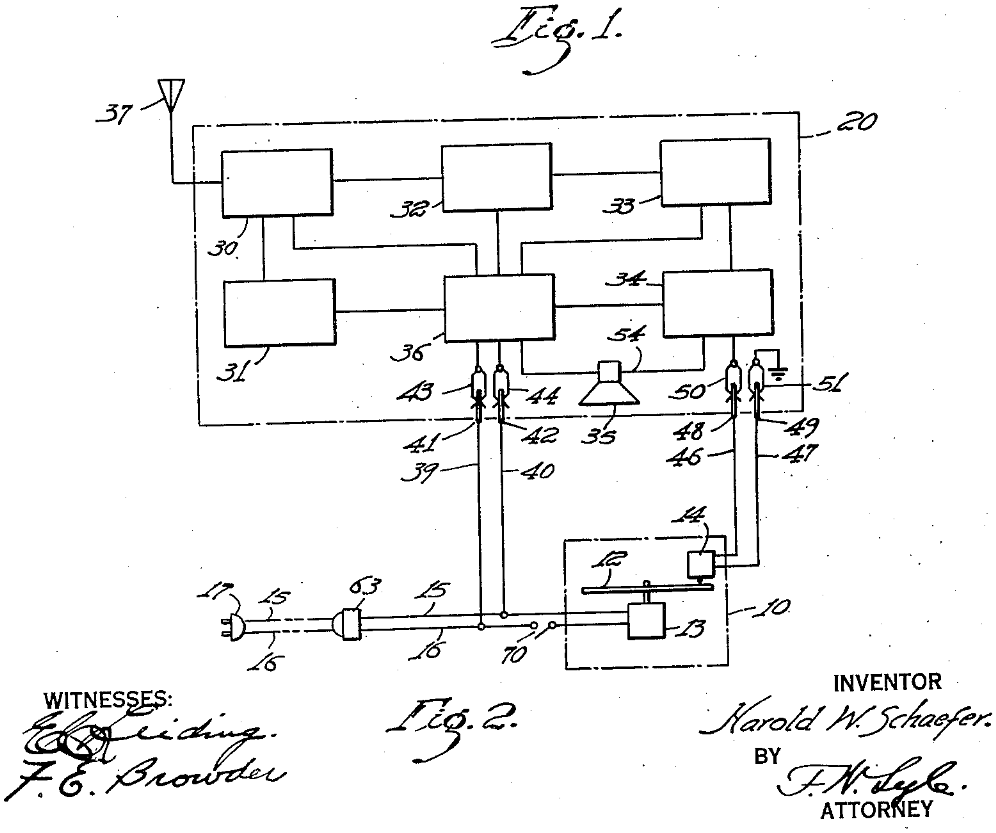
Fig. 2 is a schematic illustration of the apparatus shown in Figure 1, showing the electrical connections.

The record player comprises a cabinet 10, having a top or cover 11 and, as illustrated more clearly in Fig. 2, a turntable 12 for supporting records, a motor 13 for rotating the turntable, and a pickup mechanism 14, all of which are mounted in the cabinet 10. The motor 13 is connected to a suitable source of power, such as a house wiring circuit, by means of electrical conductors 15 and 16 and a plug 17.

The radio receiving set may be of any design. However, the set used for illustrating my invention comprises a cabinet 20 which houses a conventional superheterodyne chassis. The cabinet 20 is defined by a rear wall 21, two end walls 22 and 23, a bottom wall 24, a top wall 25 and a front wall 26. Four controls 27 extend through the front wall 26.

The chassis comprises a mixer stage 30, a local oscillator 31, an intermediate frequency amplifier 32, a detector stage 33, an audio frequency amplifier stage 34, a loudspeaker 35 which is located just behind the front wall 26 of the radio cabinet 20, and a power supply stage 36. When the radio receiver is used separately from the record player, it may be connected to any suitable antenna, such as illustrated at 37, or a built-in loop may be provided inside the cabinet 20.

As illustrated in Fig. 2, when the radio set is used in combination with the record player, the power supply stage 36 is connected to the record player power supply by electrical conductors 39 and 40 which are connected to male connector members or plugs 41 and 42. The plugs 41 and 42 are received by female connector members or jacks 43 and 44. Other electrical conductors similar to the conductors 39 and 40 extend from the jacks 43 and 44 to the power supply stage 36, to complete the electrical connection to the power supply stage. The pickup 14 is connected by means of electrical conductors 46 and 47 to a pair of male connector members or plugs 48 and 49. The plugs 48 and 49 are received by female connector members or jacks 50 and 51. Other electrical conductors similar to the conductors 46 and 47 connect the jacks 50 and 51. to the audio frequency amplifier stage 34. The output from the audio frequency amplifier stage 34 is connected to the loudspeaker 35 by electrical conductors which are represented by the reference character 54.

Figures 3, 4, 5:
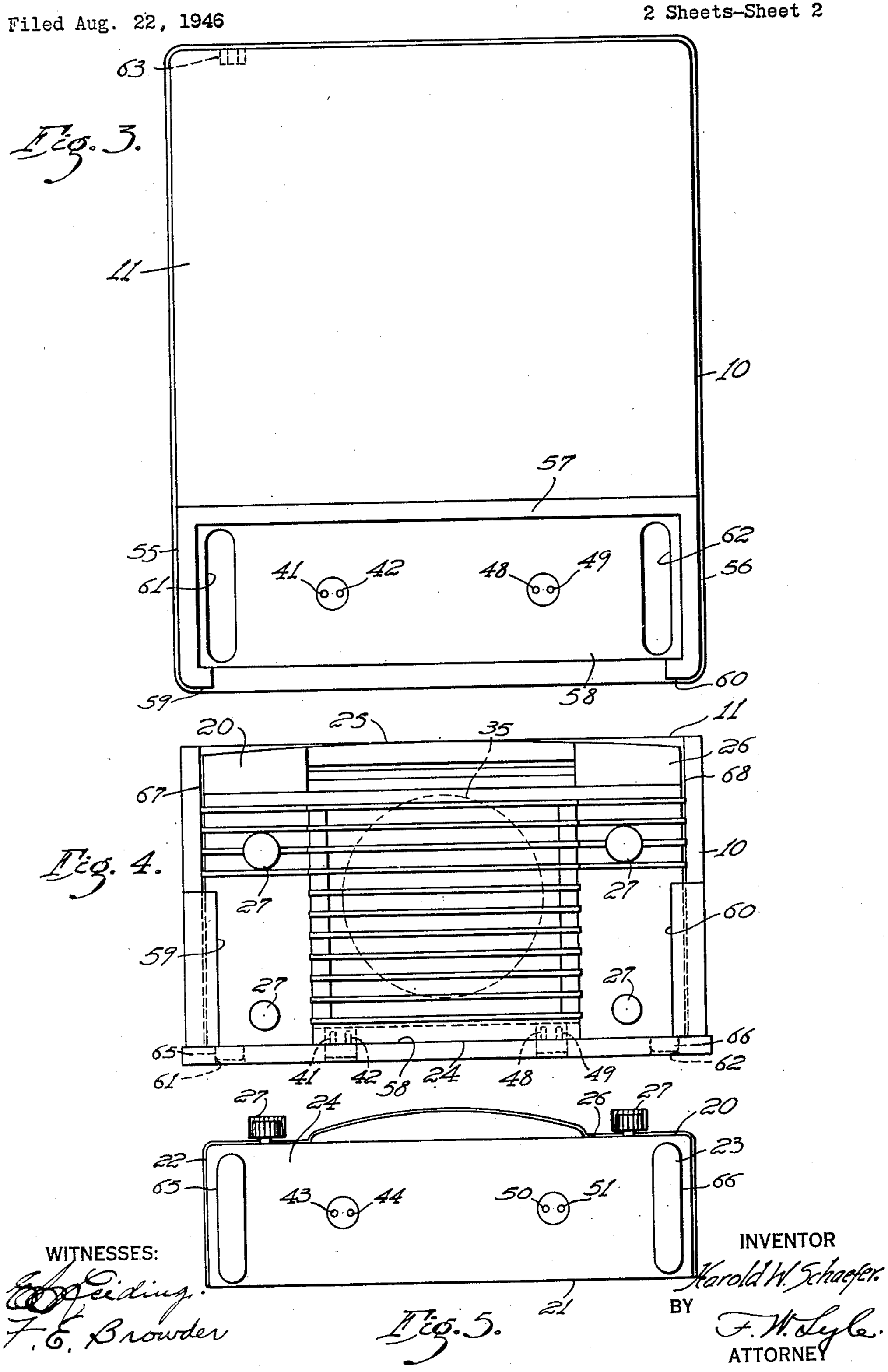
Fig. 3 is a plan view of the record player cabinet alone.
Fig. 4 is a front elevation of the apparatus shown in Figure 1, with the top of the record player cabinet closed.
Fig. 5 is a plan view of the bottom side of the radio receiving set alone.

The record player cabinet has a compartment provided at the front thereof for receiving the radio receiving set when the two units are to be used in combination. As seen from Figs. 1, 3 and 4, the compartment has an open top and an open front and it is defined by side walls 55 and 56, a rear wall 57, a bottom wall 58, and vertical front members 59 and 60 which are adjacent the respective edges of the open front. A pair of oblong slots 61 and 62, Fig. 3, are provided in the bottom wall 58 of the compartment. The function of these slots will be explained hereinafter. As seen from Figs. 3 and 4, the plugs 41, 42, 48 and 49 are also mounted on the bottom wall 58. A separable plug 63 is mounted in the rear wall of the cabinet 10. This plug is connected to the power supply by means of the plug 17 and suitable conductors which may be an extension of the conductors 15 and 16 with the separable plug 63 inserted therein. The plug 63 is connected to the record player motor 13 by the conductors 15 and 16.

The bottom wall of the radio cabinet 20 has a pair of oblong legs 65 and 66 thereon. These legs are of such size that they will just fit nicely into the oblong slots 61 and 62 which are provided in the bottom wall of the compartment. The jacks 43, 44, 50 and 51 are also provided in the bottom wall 24 of the radio receiver cabinet 20. The jacks 43 and 44 are connected to the radio receiver power supply stage 36 and the jacks 50 and 51 are connected to the audio amplifier stage 34 of the radio receiving set as shown in Fig. 2.

To place the radio receiving set in the position illustrated in Figs. 1 and 4, which is the normal position for it when records are being played on the record player, the radio receiving set is lowered substantially vertically into the compartment from a position above the record player cabinet 10. The vertical front members 59 and 60 guide the radio receiving set cabinet so that as its bottom wall approaches the bottom wall of the compartment, the plugs 41 and 42 enter the jacks 43 and 44, and the plugs 48 and 49 enter the jacks 50 and 51. During this lowering process, the legs 65 and 66 enter the slots 61 and 62. The engagement of the legs 65 and 66 with the slots 61 and 62 provides locking or attaching means which prevents the radio receiving set from shifting within the compartment when the combination is moved or tilted, and thus prevents unnecessary strain or vibration on the electrical contacts which might eventually loosen them or cause them to fail.

In addition to providing guiding means facilitating positioning of the radio receiving set in the compartment, the vertical members 59 and 60 function as retainers and prevent the radio receiving set from shifting forward or falling out of the compartment when the combination is tilted forward.

When the radio receiving set is combined with the record player, the front wall 26 of the radio cabinet 20 is the front of the combination, and the top wall 25 of the radio cabinet is substantially flush with the top 11 of the record player cabinet.

When the radio receiving set is positioned as illustrated by Figs. 1, 2 and 4, and a record is played on the turntable 12, the intelligence from the record is picked up by the pickup mechanism 14, amplified by the audio frequency amplifier 34, and then audibly reproduced by the loudspeaker 35. If it is desired to use the radio receiving set to receive radio broadcast programs while it is combined with the record player, a switch 70 is opened to disconnect the motor 13 from the power source.

The radio receiving set may be easily removed from the compartment and carried from place to place and used separately for receiving radio broadcast programs. It is removed from the compartment by grasping it near points 67 and 68 of the cabinet 20 and lifting it vertically from the compartment. Portions of the side walls 55 and 56 are cut away as indicated at 69 to permit one to get a good grasp on the cabinet 20 for this purpose. After the radio receiving set is removed from the compartment the power cord is disconnected from the record player cabinet at the plug 63 and the male member of the plug 63 is then plugged into the female connector members or jacks 43 and 44. If the plug 17 is then plugged into a suitable power source, the radio receiving set is ready to receive radio broadcast programs.

A desirable feature of my invention is that when the radio receiving set is combined for use with the record player substantially the entire front of the radio receiving set is unobstructed; all of the regular controls on the radio receiving set are easily accessible and there are no obstructions in front of the loudspeaker.

From the above description, it is seen that I have provided an improved record player and radio combination wherein the radio receiving set may be easily and quickly combined with the record player for playing records or used separately and remotely from the record player for receiving radio broadcast programs.

While I have shown my invention in but one form, it will be obvious to those skilled in the art that it is not so limited, but is susceptible of various changes and modifications without departing from the spirit thereof, and I desire, therefore, that only such limitations shall be placed thereon as are specifically set forth in the appended claims.

I claim as my invention:

1. In combination, a record player comprising a cabinet having a compartment for accommodating a radio for reproducing records played on said record player, a radio adapted to be lowered into said compartment from a position above said compartment, vertical guide means on said cabinet and adjacent the front of said compartment in such a position as to coact with said radio for guiding said radio into a proper position as it is lowered into said compartment, and connectors in said compartment electrically connecting said record player to said radio.

2. In combination, a record player comprising a cabinet having a compartment for accommodating a radio, a radio adapted to be lowered into said compartment from a position above said compartment, said record player cabinet comprising locking means effected upon lowering said radio into said compartment for restraining said radio against movement relative to said cabinet, and connectors in said compartment electrically connecting said record player to said radio.

3. In combination, a record player comprising a cabinet having mounted therein a turntable for supporting records, a motor for rotating said turntable, means for connecting said motor to a suitable source of power, and a pickup mechanism, said cabinet having a compartment at the front thereof for accommodating a radio, electrical contacts in said compartment and connected to said motor power source and said pickup mechanism, a radio adapted to be placed in said compartment, said radio comprising a power supply stage, amplifying means, a loud speaker connected to the output of said amplifier means, and electrical contact means carried by said radio which automatically engage with said first mentioned contact means in said compartment as said radio is positioned in said compartment to electrically connect said power supply stage to said motor power source and to electrically connect said pickup mechanism to said amplifier means, whereby intelligence picked up by said pickup mechanism from a record played on said turn table is audibly reproduced by said loud speaker.

4. In combination, a record player comprising a pickup and a cabinet having a compartment adjacent the front thereof for accommodating a radio receiving set for reproducing records played on said record player, a radio receiving set comprising amplifying means and a speaker for insertion in said cabinet, electrical connectors in said compartment, other electrical connectors associated with said radio for connecting to said first electrical connectors in said compartment to electrically connect said pickup to said amplifying means and speaker so that a record played on said record player is audibly reproduced by said speaker.

5. In combination, a record player comprising a cabinet including a compartment adjacent the front thereof for accommodating a radio receiving set for reproducing records played on said record player, a radio receiving set adapted to be inserted into said compartment by lowering from a position above said compartment, said radio receiving set having a loud speaker at the front thereof through which records played on said record player are audibly reproduced, said cabinet comprising vertical guide members adjacent the front of said compartment for coacting with and guiding said radio receiving set into position as it is lowered into said compartment, said guide means being so constructed as to extend along the front of said radio receiving set for a distance short of said loud speaker, and means in said compartment electrically connecting said radio to said record player.

6. In combination, a record player comprising a cabinet, a radio having controls at the front thereof for reproducing records played on said record player, said record player cabinet including a compartment adjacent the front thereof for accommodating said radio, said compartment having an opening in the front and top thereof, said radio being adapted to be lowered into said compartment through said open top from a position above said comparament, said radio controls being accessible through said open front of said compartment after said radio has been lowered into said compartment, and means in said compartment electrically connecting said radio to said record player.

7. In a combination, a record player comprising, a cabinet having a compartment at the front thereof, a radio comprising a cabinet for insertion into said compartment, said compartment being open at the front and the top, said radio being insertable into said compartment through said open top, means comprising a portion of said record player cabinet for retaining said radio in position in said compartment, means comprising a portion of said radio cabinet providing the front wall of said combination when said radio is in said compartment, and means in said compartment electrically connecting said radio to said record player.

8. In combination, a record player comprising a cabinet, said cabinet comprising a compartment at the front thereof substantially the same depth as said record player cabinet, a radio receiver adapted for insertion into said compartment for reproduction of records played on said record player, said radio being substantially flush with the top of said record player cabinet when in said compartment, said radio being removable from said compartment and usable separately from said record player to receive radio programs, and electrical connecting means electrically connecting said radio to said record player when said radio is in said compartment.

HAROLD W. SCHAEFER.

REFERENCES CITED

The following references are of record in the file of this patent:

UNITED STATES PATENTS

| Number | Name | Date |
|---|---|---|
| D. 148,184 | Peterson | Dec. 23, 1947 |
| D. 152,125 | Peterson | Dec. 14, 1948 |
| 1,855,933 | Alden | Apr. 26, 1932 |

FOREIGN PATENTS

| Number | Country | Date |
|---|---|---|
| 314,660 | Great Britain | July 4, 1929 |